United States Patent [19]
Renfro et al.

[11] 3,940,931
[45] Mar. 2, 1976

[54] AUTOMATIC CONTROL CIRCUIT FOR AN ELECTRICALLY POWERED HYDRAULIC PUMP

[75] Inventors: Kenneth W. Renfro, Macon; Richard E. Guhl, Decatur, both of Ill.

[73] Assignee: Caterpillar Tractor Co., Peoria, Ill.

[22] Filed: Jan. 17, 1975

[21] Appl. No.: 541,752

[52] U.S. Cl. ................ 60/403; 60/405; 60/DIG. 2; 180/82 R
[51] Int. Cl.² .................... F15B 20/00; F15B 11/16
[58] Field of Search ............ 60/328, 403, 404, 405, 60/DIG. 2; 180/82 R

[56] References Cited
UNITED STATES PATENTS

| | | | |
|---|---|---|---|
| 2,954,671 | 10/1960 | Kress | 60/405 |
| 3,434,282 | 3/1969 | Shelhart | 60/328 X |
| 3,762,492 | 10/1973 | Rory | 60/405 |

*Primary Examiner*—Edgar W. Geoghegan
*Attorney, Agent, or Firm*—Phillips, Moore, Weissenberger Lempio & Strabala

[57] ABSTRACT

An emergency hydraulic system for use in a vehicle having an engine which not only powers the vehicle but also drives a main hydraulic pump to supply hydraulic fluid under pressure to a hydraulic control means is disclosed. The emergency hydraulic system includes an auxiliary hydraulic pump driven by an electric motor to provide an auxiliary source of hydraulic fluid under pressure to the hydraulic control means under emergency conditions. An electrical control circuit for the electric motor is described which control circuit will automatically activate the electric motor whenever the engine is operating normally but the flow of hydraulic fluid from the main hydraulic pump falls below a given level and will automatically inactivate the electric motor whenever the engine is operating normally and the flow of hydraulic fluid from the main hydraulic pump is above a given level. As disclosed, the control circuit also includes means for the manual operation thereof and means for automatically activating the electric motor only if the engine of the vehicle should fail after it has been in normal operation.

10 Claims, 1 Drawing Figure

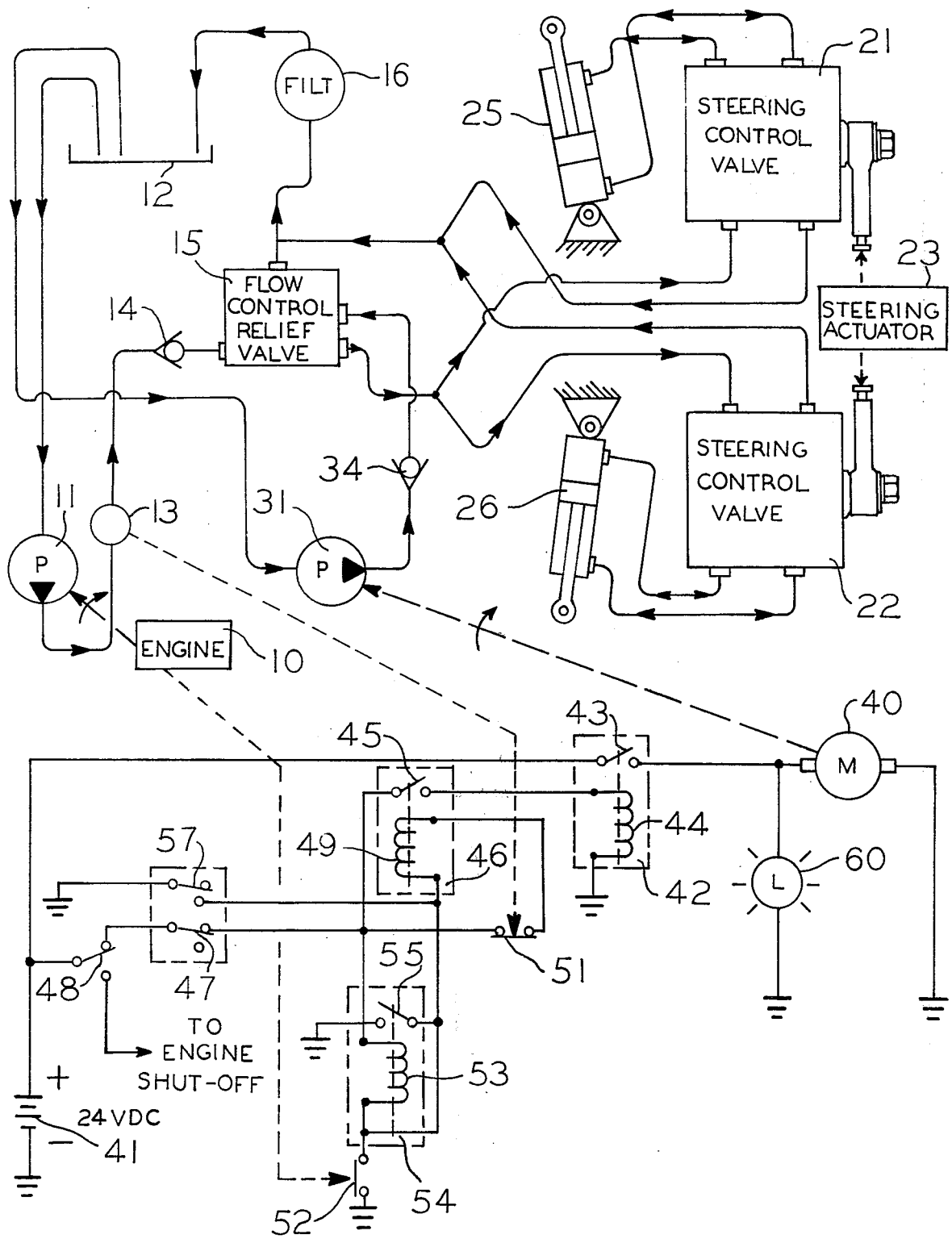

AUTOMATIC CONTROL CIRCUIT FOR AN ELECTRICALLY POWERED HYDRAULIC PUMP

BACKGROUND OF THE INVENTION

This invention relates to a hydraulic control system for use in vehicles having an engine which not only powers the vehicle but also drives a pump to provide hydraulic fluid under pressure for the hydraulic control system and more particularly to such a system including an electrical circuit and an electrically operated motor pump unit for automatically supplying hydraulic fluid under pressure to the control system if the engine or main pump fail in operation.

For example, the weight of various self-propelled vehicles of the type utilized in the earth moving industry make it necessary to provide power steering to aid the vehicle operator in controlling the vehicle. Such power steering conventionally takes the form of a hydraulic circuit including steering control means actuated by hydraulic fluid under pressure and the usual practice is to provide a pump driven by the vehicle engine to provide the pressurized hydraulic fluid. Thus, if the engine of the vehicle fails in operation, it becomes extremely difficult to control the vehicle while it is being brought to a stop and if the engine cannot be started, then it will be difficult to control the vehicle while it is being moved to a place where repairs can be made.

It has been proposed in the prior art to provide an auxiliary or emergency hydraulic system including an electrically driven motor pump unit to provide hydraulic fluid under pressure to the control system if the engine or main pump is inoperative for any reason. For example, U.S. Pat. No. 3,153,462 discloses such an electrically powered auxiliary or emergency system which is manually actuated by the operator upon the occurrence of an emergency condition. However, by the time the operator realizes that an emergency condition has occurred, it may be too late to energize the emergency system in time to avoid an accident.

Thus, it is an object of this invention to provide an electrical control circuit for automatically actuating the electric motor of an auxiliary or emergency system for supplying hydraulic fluid under pressure if the engine or the main hydraulic pump should fail for any reason.

Automatic control circuits of this type have been proposed as disclosed in U.S. Pat. Nos. 2,954,671 and 3,434,282. However, such previously proposed control circuits are undesirable in that the auxiliary or emergency system is actuated whenever the engine of the vehicle is started.

It is an object of this invention to provide a control system for automatically actuating the emergency hydraulic system only upon a failure of the engine or main hydraulic pump after the engine has been in normal operation.

In addition, the automatic operation of control systems proposed in the prior art has depended upon means for sensing the pressure of the hydraulic fluid provided by the main hydraulic pump whereas the fluid flow from the main hydraulic pump is a more important criteria with respect to the satisfactory operation of the main hydraulic system. This is particularly true in hydraulic systems wherein a constant flow of hydraulic fluid is maintained into and out of the reservoir and the pressures encountered in the system vary depending on the state of actuation of the system.

Thus, it is a further object of this invention to provide a control system sensitive to the flow of hydraulic fluid from the main hydraulic pump for automatically actuating the emergency hydraulic system when such flow falls below a given level.

SUMMARY OF THE INVENTION

Briefly, a vehicle having an engine, hydraulic control means actuated by hydraulic fluid under pressure, a main hydraulic pump driven by the engine to provide hydraulic fluid under pressure for actuating such control means and an auxiliary hydraulic pump driven by an electric motor to supply hydraulic fluid under pressure for actuating such control means is provided with an electrical control circuit for such electric motor according to this invention which control circuit includes a source of electrical power and a first solenoid operated relay having normally open contacts connected in series with the electric motor across the source of electric power. The normally open contacts of a second solenoid operated relay are connected in series with the solenoid of the first solenoid operated relay across the source of electrical power. The solenoid of the second solenoid operated relay is connected in series with both the normally closed contacts of a first switch means adapted to be opened by a given fluid flow from the main hydraulic pump and the normally open contacts of a second switch means adapted to be automatically closed when the engine of the vehicle is in normal operation. A third solenoid operated relay is provided having normally open contacts connected in parallel with the normally open contacts of the second switch means and with its solenoid electrically connected across the series connected normally closed contacts of the first switch means and solenoid of the second solenoid operated relay. The first switch means is adapted to open before the second switch means are automatically closed in normal operation. A third switch means having normally closed manually operable contacts interposed between at least the solenoid of the third solenoid operated relay and the source of electrical power and a fourth switch means having normally open manually closable contacts connected in parallel with said second switch means are preferably included in the control system.

BRIEF DESCRIPTION OF THE DRAWING

The foregoing and other objects and features of this invention will be more fully understood from a reading of the following detailed description of a preferred embodiment thereof in conjunction with the attached drawings wherein:

The lone drawing FIGURE shows the automatic control circuit of this invention schematically with the electrical elements thereof shown at the bottom of the FIGURE and the hydraulic elements thereof shown in conjunction with a hydraulic circuit to which this invention is applicable at the top of the FIGURE, the mechanical interconnection between the electrical and hydraulic circuits being indicated by dotted lines.

DETAILED DESCRIPTION OF PREFERRED EMBODIMENT

In accordance with the preferred embodiment of this invention the hydraulic system shown schematically at the top of the single FIGURE of drawing is a power steering system suitable for use on a heavy earth moving vehicle in which the engine 10 not only provides motive power for the vehicle but also drives a main hydraulic pump 11. The main hydraulic pump 11 takes suction from a reservoir 12 containing a quantity of hydraulic fluid and supplies a flow of such fluid through a flow sensing device 13 and a check valve 14 to a flow control relief valve 15. The service output of the flow control relief valve 15 is connected in parallel to the inputs of a pair of steering control valves 21 and 22. The relief outlet of the flow control relief valve is connected through a filter 16 back into the reservoir 12.

The steering control valves 21 and 22 are adapted to be operated by an appropriate steering actuator 23 in the usual manner to provide for the flow of hydraulic fluid into and out of a pair of hydraulic steering motors or double acting rams 25 and 26. The hydraulic motors 25 and 26 are each connected between the vehicle frame and a different one of a pair of steerable wheels (not shown) to thereby provide for the steering of the vehicle in operation. The outlet of the steering control valves 21 and 22 are connected in parallel to the filter 16 and thence back into the reservoir 12.

It will be understood that when the steering actuator 23 is at rest, there will be no flow of hydraulic fluid through the steering control valves 21 and 22 either to or from the hydraulic motors 25 and 26. Under such circumstances, the flow of hydraulic fluid will be diverted by the flow control relief valve through the relief outlet thereof and back to the reservoir 12 through the filter 16.

According to this embodiment of the invention an auxiliary hydraulic pump 31 is provided which takes suction from the reservoir 12 at a lower point therein than the point at which the main hydraulic pump 11 takes suction and provides a flow of fluid to a second inlet of the flow control relief valve 15 through a second check valve 34. The auxiliary hydraulic pump 31 is driven by an electric motor 40 and is adapted to deliver the required flow of hydraulic fluid for operation of the hydraulic motors 25 and 26 in the event that the flow of hydraulic fluid from the main pump 11 should fail for any reason. The source of electrical power for the electric motor 40 is the battery 41 of the vehicle on which the system is mounted. According to this invention, the electric motor 40 is automatically actuated by the electrical control circuit shown schematically at the bottom of the single FIGURE of drawing only if the flow of hydraulic fluid fails after the engine of the vehicle has been placed in normal operation. Specifically, the electrical control circuit according to the teaching of this invention will not actuate the electric motor 40 during the initial start-up of the engine 10, thus avoiding the imposition of an excessive demand for electrical power on the battery 41 of the vehicle.

To this end, the electrical control circuit according to the teaching of this invention includes a first solenoid operated relay 42 having normally open contacts 43 connected in series with the motor 40 across the battery 41. The solenoid 44 is connected in series with the normally open contacts 45 of a second solenoid operated relay 46 across the battery 41 through a pair of normally closed switches 47 and 48. As shown in the drawing, the normally closed switch 48 may be a single pole, double throw switch forming part of the engine shut-down or "panic button" control conventionally used with diesel engines. The function of the normally closed switch 47 will be more fully discussed hereinafter. However, at this point it should be understood that the functions of switches 47 and 48 could be combined in one single pole, double throw switch structure and that the switch 47 may be located in the control circuit other than as shown in the drawing in other embodiments of this invention.

The solenoid 49 of the second solenoid operated relay 46 is connected in series with a first switch means 51 having normally closed contacts adapted to be opened by the flow sensing device 13 when a given flow is sensed from the main hydraulic pump 11 and with a second switch means 52 having normally open contacts adapted to be automatically closed after the engine 10 is in normal operation. For example, the engine 10 may include an appropriate mechanical device for closing the contacts of the switch means 52 in response to the attainment of a given oil pressure within the engine 10.

The series array of solenoid 49 and first and second switch means 51 and 52 is connected in parallel with the series array of solenoid 44 and normally open contacts 45 of relay 46. Similarly, the solenoid 53 of a third solenoid operated relay 54 is connected in parallel with the series array consisting of solenoid 49 and first switch means 51. The solenoid operated relay 54 has normally open contacts 55 which are connected in parallel with the second switch means 52. Finally, a normally open switch 57 is also connected in parallel with the second switch means 52.

From the above it will be understood that the third solenoid operated relay 54 serves as a latching relay which conditions the automatic electrical control circuit of this invention for operation in the desired manner. Thus, when the engine 10 is started and the oil pressure therein has increased to a value representative of normal engine operation, the second switch means 52 will close thereby energizing the solenoid 53 through the normally closed switches 47 and 48. Energization of the solenoid 53 will close the normally open contacts 55 thereof, thereby maintaining the energization of the solenoid 53 even if the switch means 52 should subsequently open. Thus, once the engine 10 has been placed in normal operation, the control circuitry of this invention will be conditioned for automatic operation.

It will be further understood that the normal operation of the engine 10 should result in the required flow of hydraulic fluid from the main hydraulic pump 11 which flow will be sensed by the device 13 resulting in the opening of the normally closed contacts of switch means 51. Thus, the solenoid 49 of the second solenoid operated relay 46 will not be energized unless the required flow of hydraulic fluid from the main hydraulic pump 11 fails for some reason. Upon failure of such flow, the contacts of switch means 51 will automatically close thereby energizing the solenoid 49 and closing the normally open contacts 45 thereof. The closure of normally open contacts 45 of relay 46 will energize the solenoid 44 of the first solenoid operated relay 42 to close the normally open contacts 43 thereof to activate the motor 40. Activation of the motor 40 will result in the required hydraulic fluid flow from the auxiliary pump 31 to supply the hydraulic system.

The check valves 14 and 34 of course provide the required isolation between the main hydraulic pump 11 and the auxiliary hydraulic pump 31. The fact that the auxiliary hydraulic pump 31 takes suction from a lower point in the reservoir 12 than the main hydraulic pump 11 will provide steering capability for a short period of time after failure of flow from the main hydraulic pump 11 due to loss of hydraulic fluid as through a rupture for example. Thus, in order to give the operator of the vehicle warning that the auxiliary hydraulic system is in operation, an appropriate warning light 60, for example, may be connected in parallel with the electrical motor 40.

It will be understood that once the engine 10 has been placed in normal operation, the third relay 54 will remain latched due to closure of the contacts 55 thereof until the solenoid 53 thereof has been disconnected from the power source 41 as by opening either one of the normally closed switches 47 and 48. Where the engine 10 is shut down through manipulation of the switch 48, the power to the solenoid 53 of the third solenoid operated relay 54 will be interrupted automatically thereby allowing the contacts 55 thereof to open. The switch means 52 will also return to its normally open condition since the oil pressure in the engine 10 will fail when the engine 10 is shut down. Thus, the automatic control circuit of this invention will be automatically turned off whenever the engine 10 of the vehicle is shut down.

However, if the engine 10 of the vehicle should stall in operation and cease to function, then the automatic control circuit of this invention would remain in operation since the normally open contacts 55 of the third solenoid operated relay 54 will remain latched even though the contacts of the second switch means 52 return to their normal open condition upon failure of the engine oil pressure. It will then be necessary to manually open normally closed switch 47 in order to inactivate the control system of this invention prior to restarting the engine 10 in order to avoid an excessive drain on the battery 41 during the attempted start-up of the engine 10. It will be understood that only a momentary opening of the normally closed switch 47 will be required to allow the contacts 55 of the relay 54 to open.

It will be understood that if the attempts to restart the engine 10 are unsuccessful, then the second switch means 52 will remain in their normally open condition and the relay 54 will not be energized in order to condition the electrical control circuit for operation by the closure of the contacts 55 of relay 54. If it is desired to move the vehicle to some place where repairs to the engine 10 can be carried out, it would be desirable to actuate the electrical motor 40 in order to provide hydraulic fluid flow to enable steering of the vehicle during its movement to the place where it can be repaired. Thus, a momentary closure of the normally open switch 57 will result in a latching of the normally open contacts 55 of the relay 54 thereby conditioning the electrical control circuit for automatic operation due to the fact that there will be no flow of hydraulic fluid from the pump 11 to actuate the sensing means 13 and open the normally closed contacts of the first switch means 51. It will be understood that the motor 40 cannot be actuated so long as there is sufficient flow from the pump 11 to cause the flow sensing means 13 to open the normally closed contacts of the first switch means 51.

From the above it will be understood that the electrical control circuit according to the teaching of this invention will always be in condition for emergency operation but that it will not operate unless the engine 10 has been placed in normal operation. If normal operation of the engine 10 does not result in a sufficient flow of hydraulic fluid, then the motor 40 will be automatically activated by the electrical control system. Similarly, if the engine 10 should fail after a period of normal operation, the motor 40 will be activated. However, the motor 40 will not be activated by the electrical control circuit of this invention during the period in which the engine is being started and until it has reached its normal operating level. To this end, the second switch means 52 is specifically adapted according to this invention so that it will not close until after the normally closed contacts of the switch means 51 have been opened by the flow of hydraulic fluid from the pump 11 under normal conditions.

The normally closed switch 47 and the normally open switch 57 may both be spring loaded so that they will automatically return to their normal condition after being manually operated. Thus, the electrical control circuit according to the teaching of this invention will tend to remain in condition for automatic operation at all times, subject to the requirement, of course, that the circuit be turned off by the manual actuation of normally closed switch 47 following any period during which the control circuit has been placed in operation by the manual actuation of the normally open switch 57.

It will be understood that this invention is applicable to any system in which an electric motor is used to power an auxiliary hydraulic pump which is used as a back-up pump in a hydraulic system. Thus, the auxiliary pump 31 might be included in a totally redundant auxiliary hydraulic system rather than being connected in parallel with the main hydraulic pump 11. It is believed that those skilled in the art will find other hydraulic systems to which the electrical control circuit of this invention may be applied with advantage.

What is claimed is:

1. In a vehicle having an engine, hydraulic control means actuated by hydraulic fluid under pressure, a main hydraulic pump driven by said engine to provide hydraulic fluid under pressure for actuating said control means, and an auxiliary hydraulic pump driven by an electric motor to provide hydraulic fluid under pressure for actuating said control means; an electrical control circuit for said electric motor comprising:
  a. a source of electrical power;
  b. a first solenoid operated relay having normally open contacts connected in series with said electric motor across said source of electrical power;
  c. a second solenoid operated relay having normally open contacts connected in series with the solenoid of said first solenoid operated relay across said source of electrical power;
  d. a third solenoid operated relay having normally open contacts;
  e. first switch means having normally closed contacts adapted to be automatically opened by a given fluid flow from said main hydraulic pump;
  f. second switch means having normally open contacts adapted to be automatically closed after said engine is in normal operation; and
  g. third switch means having normally closed contacts adapted to be manually opened; said normally closed contacts of said first switch means and the solenoid of said second solenoid operated relay being electrically connected in series with each other and with said normally open contacts of said second switch means across said source of electrical power, the solenoid of said third solenoid operated relay being electrically connected across said series connected normally closed contacts of said first switch means and solenoid of said second solenoid operated relay, said normally open contacts of said third solenoid operated relay being electrically connected in parallel with said normally open contacts of said second switch means, and said contacts of said third switch means being interposed between at least said solenoid of said third solenoid operated relay and said source of electrical power.

2. An electrical control circuit in a vehicle as claimed in claim 1 wherein a fourth switch means having normally open contacts adapted to be manually closed is connected in parallel with both said normally open contacts of said third solenoid and said normally open contacts of said second switch means.

3. An electrical control circuit in a vehicle as claimed in claim 1 wherein said third switch means is electrically connected to shut off said engine of said vehicle when said normally closed contacts thereof are manually opened.

4. An electrical control circuit in a vehicle as claimed in claim 3 wherein said third switch means is a single pole, double throw switch structure.

5. An electrical control circuit in a vehicle as claimed in claim 1 wherein said normally open contacts of said second switch means are adapted to be closed by a given oil pressure in the oil lubricating system of said engine of said vehicle.

6. An electrical control in a vehicle as claimed in claim 1 wherein said normally open contacts of said second switch means are adapted to be automatically closed after said normally closed contacts of said first switch means are automatically opened during normal starting of said engine of said vehicle.

7. An electrical control system as claimed in claim 1 wherein an electrically operated indication means is connected in parallel with said electric motor.

8. An electrical control circuit in a vehicle as claimed in claim 1 wherein said auxiliary hydraulic pump is hydraulically connected in parallel with said main hydraulic pump and a pair of check valves are included in the hydraulic system, each at the output of a different one of said main and auxiliary pumps to prevent reverse fluid flow through said main and hydraulic pumps.

9. An electrical control circuit in a vehicle as claimed in claim 8 wherein said main and auxiliary hydraulic pumps take suction from and return hydraulic fluid to a common reservoir and said auxiliary hydraulic pump takes suction from a vertically lower point in said reservoir than said main hydraulic pump.

10. An electrical control circuit in a vehicle as claimed in claim 1 wherein said normally closed contacts of said third switch means are interposed between said source of electrical power and all of the electrical elements of said electrical control circuit other than said normally open contacts of said first solenoid operated relay and said electrical motor.

* * * * *